Figure 1:
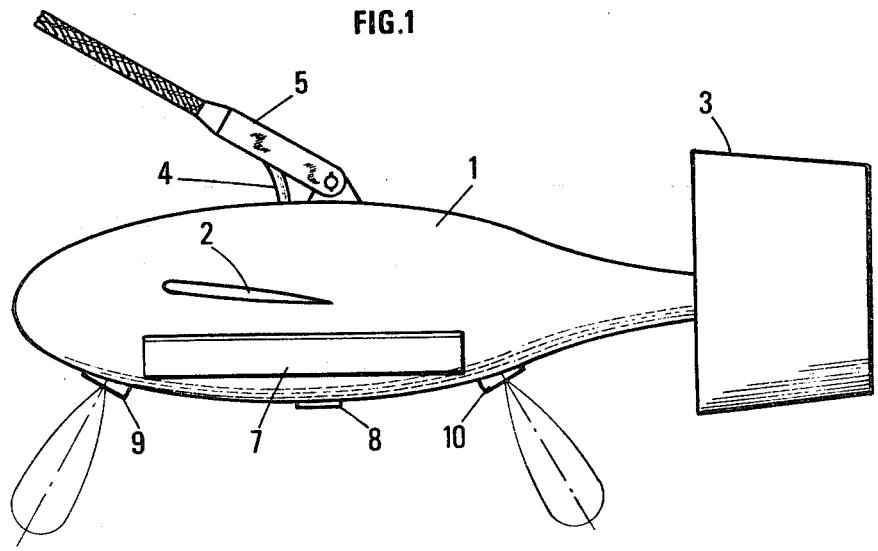

United States Patent [19]

Delignieres

[11] 4,216,537

[45] Aug. 5, 1980

[54] SONAR FOR THE TOPOGRAPHIC REPRESENTATION OF A SUBMERGED SURFACE AND UNDERLYING STRATA

[75] Inventor: Robert Delignieres, Mareil Marly, France

[73] Assignee: Institut Francais du Petrole, Rueil-Malmaison, France

[21] Appl. No.: 970,901

[22] Filed: Dec. 19, 1978

[30] Foreign Application Priority Data

Dec. 20, 1977 [FR] France .................. 77 38723
Jul. 10, 1978 [FR] France .................. 78 20750

[51] Int. Cl.$^2$ ............................. G01S 9/68
[52] U.S. Cl. .................... 367/88; 367/91; 367/92; 367/106
[58] Field of Search .......... 340/3 T, 3 D; 367/88, 367/92, 91, 106

[56] References Cited

U.S. PATENT DOCUMENTS

| | | | |
|---|---|---|---|
| 3,437,987 | 4/1969 | Burg | 340/3 D |
| 3,754,207 | 8/1973 | Delignieres | 340/3 D |
| 4,075,599 | 2/1978 | Kosalos et al. | 340/3 T |

Primary Examiner—Richard A. Farley
Attorney, Agent, or Firm—Millen & White

[57] ABSTRACT

This sonar system, placed on a vehicle such as a ship or a submarine, comprises transducer means for transmitting and receiving acoustic waves at two different frequencies, said reception means being adapted to generate echograms of the submerged surface from the received echoes of the transmitted pulses, the directivity diagram of said transducer means comprising a main transmission lobe whose axis is inclined with respect to a vertical line in a plane orthogonal to a first direction of displacement of the vehicle and a second transmission lobe oriented along a vertical line, means for determining the displacement velocity of the ship along said first direction, means for determining the water depth below the vehicle from the measured values of the propagation time of the waves transmitted along the direction of the secondary lobe and means for determining the displacement velocity of the vehicle in a direction orthogonal to the first one, by measuring the frequency of the acoustic waves received along a particular direction of the main transmission lobe.

20 Claims, 6 Drawing Figures

SONAR FOR THE TOPOGRAPHIC REPRESENTATION OF A SUBMERGED SURFACE AND UNDERLYING STRATA

This invention relates to a device of the sonar type for obtaining a topographic picture of a submerged surface as well as of the underlying strata.

More precisely the invention concerns an echo-sounding device submerged in water and towed behind a ship, whereby it is possible to represent the topography of the water bottom on both sides of the path followed by the towing ship as well as seismic cuts of the sub-layers close to the water bottom.

The logging device according to the invention is particularly well adapted to make sonograms at great depth.

Irrespective of the depth range, several types of sonars can be used according to the requirements: either a high frequency sonar having a good resolution but of short range, or a sonar of low frequency at great range but of poor resolution, or still an association of the two preceding types of sonar in order to obtain simultaneously a long range and a good resolution. This last solution has the disadvantage of being expensive. In most cases, the transmission frequency of the sonars is so selected as to achieve a compromise between the acceptable range and definition for applications at mean depth. Such a sonar is described for example in the U.S. Pat. No. 3,754,207. While such sonars of mean frequency are convenient for obtaining sonograms at relatively low depths, this is not the case for the investigation at very great depth which requires the optimization of both the penetration and resolution qualities. The echo-sounder may be incorporated for example in a profiled submersible body or "fish" which is lowered at great depth. The time required for immersing the fish being sometimes several hours, it becomes necessary to make use of all the investigations means in order to obtain continuously both a good penetration and a good resolution.

Moreover it is known of those skilled in the field of sonars, in particular, that the reflecting coefficient of a sandy bottom is substantially independent of the frequency at the transmitted acoustic pulses while the reflecting coefficient of a bottom of shingles or of similar kind, varies by 3 dB to 6 dB per octave. It is also known that the reflecting coefficient of a rocky bottom is far higher than that of other bottoms and is clearly recognizable.

The device according to the invention exhibits all the qualities required to attain the objects which can be assigned to a sonar adapted for use on bottoms at great depth.

It provides for a topographic picture of a submerged surface from a vehicle moving with respect to said surface.

The device first comprises acoustic means for determining the displacement velocity of the vehicle along a first direction of displacement and at least one transducer whose directivity diagram comprises a principal transmission lobe whose axis is inclined with respect to a vertical line in a plane orthogonal to the first direction as well as a secondary transmission lobe oriented substantially along a vertical line. It is remarkable in that the transducer is adapted to transmit and receive acoustic waves at two different frequencies and in that it comprises transmission means, for controlling the transmission from the acoustic pulse transducer at two different frequencies, and reception means, for generating from the echoes of the pulses transmitted from the transducer, echograms of the submerged surface, laterally with respect to the first direction of displacement of the vehicle, to determine the water depth below the vehicle by measuring the propagation time of the acoustic waves transmitted along the directions of the secondary lobe and for calculating its displacement velocity along a direction orthogonal to the first direction, by measuring the frequency of the acoustic waves received along a particular direction of the main lobe.

The successive transmission, from the pulse transducer, at two different frequencies, offers at first the advantage of obtaining two kinds of echograms whose qualities are complementary. The use of the lower frequency results in a device of a larger range. Conversely, the higher frequency results in a better resolution.

The use of a transducer whose directivity diagram comprises two lobes, in combination with convenient transmission and reception means, makes it possible, not only to effect the echogram of the bottom surface at two different frequencies, but also to measure the transversal velocity of the vehicle as well as its distance from the bottom, whereas in the previous devices, this set of results could be obtained only by other additional special systems of the echo-sounder or Doppler sonar types.

Preferably, the device of the invention comprises two transducers having substantially identical characteristics, oriented symmetrically with respect to a vertical line, in a plane orthogonal to the first direction of displacement. The control means of these transducers are adapted, for example, to the transmission of pulses whose lower frequency is different for the two transducers. Transducer means are used to sense the echoes of very penetrating parametric acoustic waves of low frequency resulting from the combination of pulses at different frequencies transmitted from the two transducers.

In addition, the receiving means comprises means for comparing identical characteristics of the received echoes, respectively corresponding to the transmitted acoustic pulses of different frequencies.

The use of such comparison means takes advantage of the variation of the reflecting oefficient and/or its absence of variation to recognize the nature of the bottom.

The comparison means advantageously consist of elements for effecting the quotient between the values of identical characteristics of the received echoes.

Figure 2:
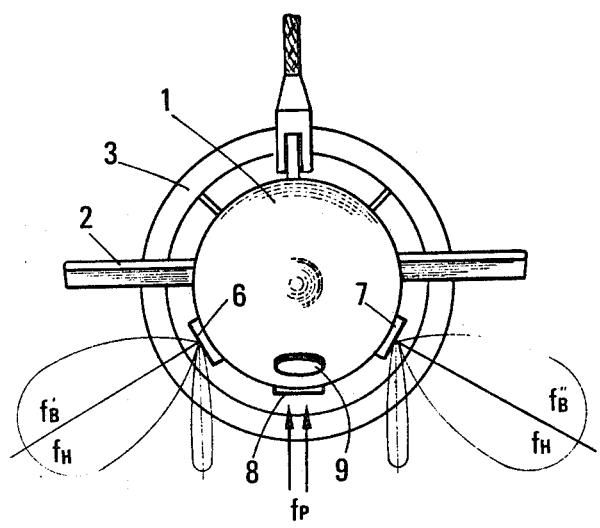
Figure 3:
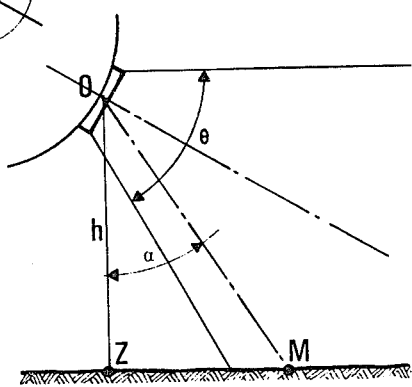
Figure 4:
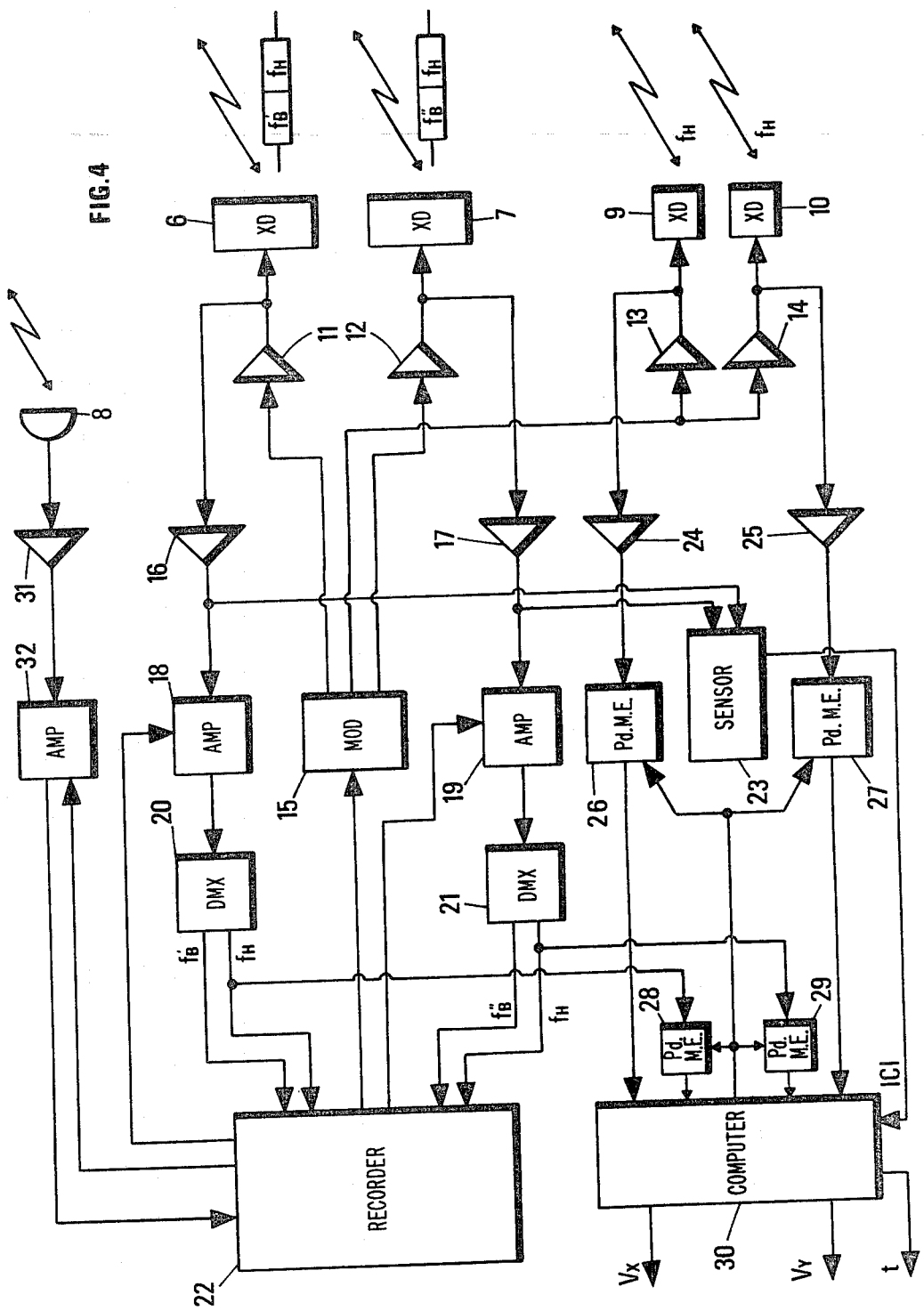
Figure 5:
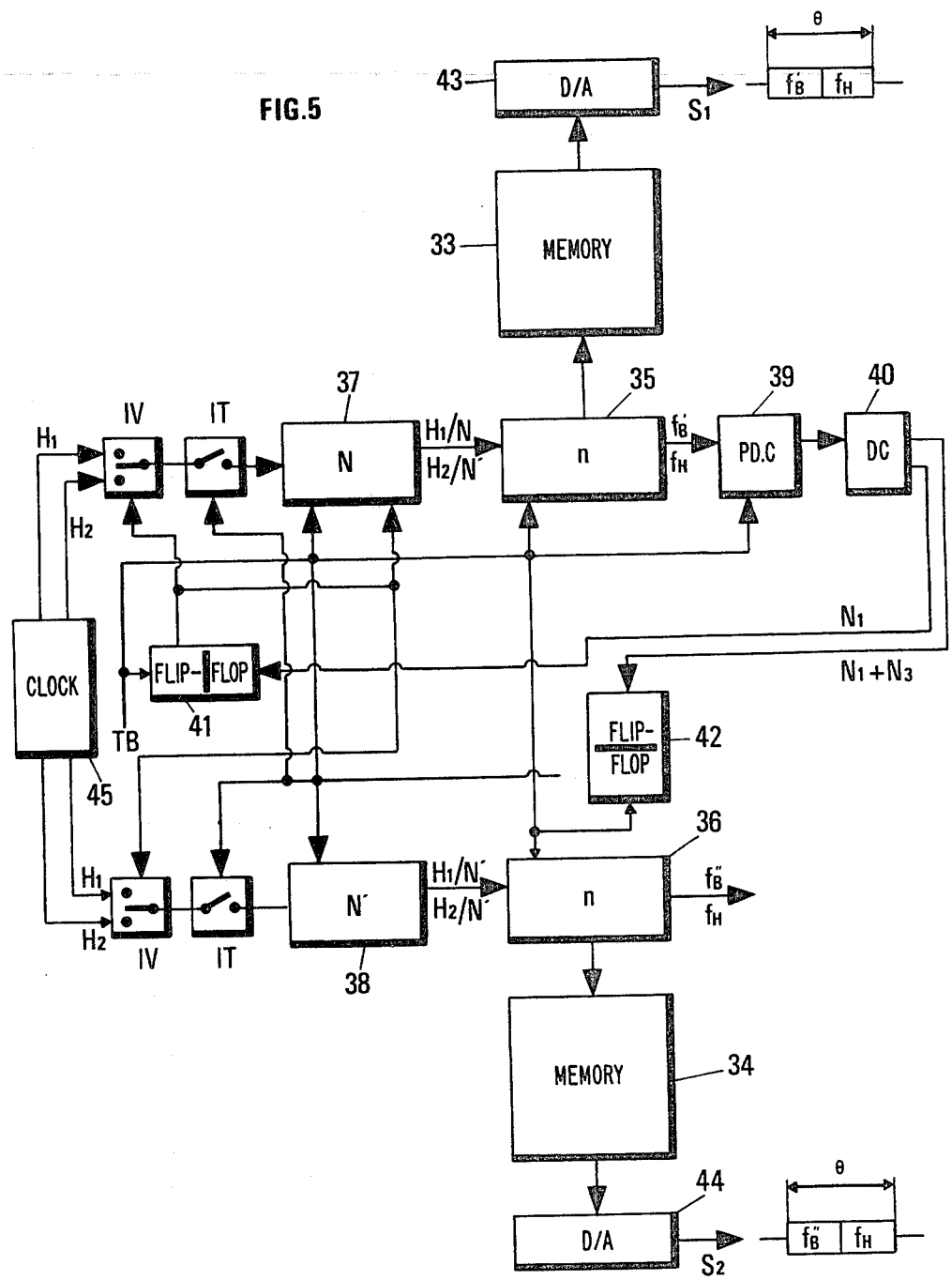
Figure 6:
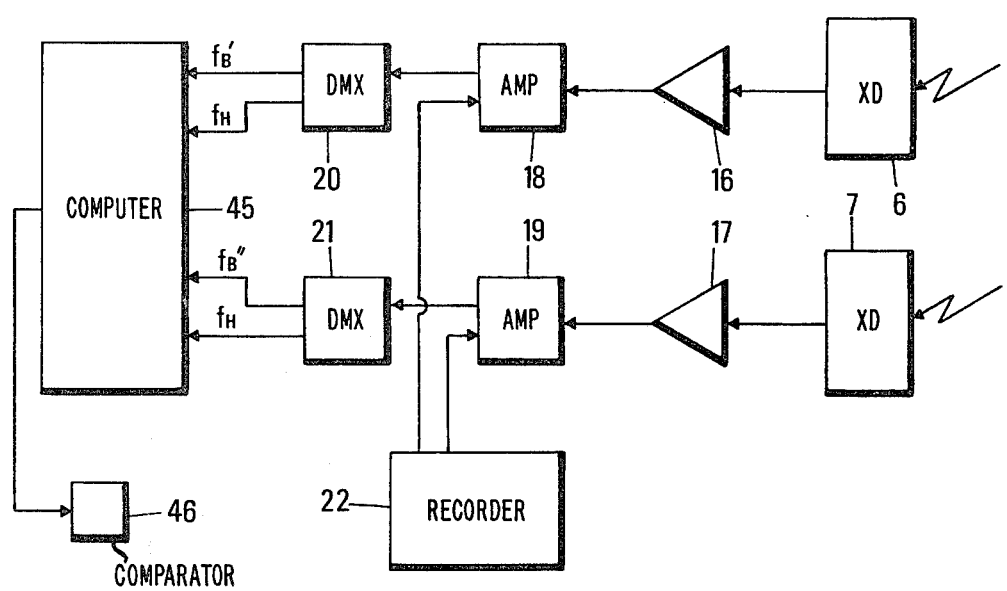

Other characteristics and advantages will be made apparent from the following description of a particular non-limitative example of embodiment of the invention, given with reference to the accompanying drawings wherein:

FIG. 1 diagrammatically shows a profile view of a vehicle or fish adapted to contain the device, FIG. 2 diagrammatically shows a front view of a fish, FIG. 3 shows the location of a reference axis OM inside the transmission beam of a lateral transducer for determining the transversal velocity of the vehicle, FIG. 4 shows a synoptic diagram of the whole device, FIG. 5 diagrammatically shows a transmission modulator, and FIG. 6 shows means for comparing identical characteristics of pulses transmitted at two different frequencies, these means being associated to reception means of the echoes received by the lateral transducers already shown on FIG. 4.

The device according to the invention is included in a movable vehicle consisting, for example, of a submersible profiled body or fish 1 of known type (FIGS. 1 and 2) comprising stabilization means. This means comprises for example a frustoconical frame 3 surrounding the rear portion of the fish and paddles 2. The latter may cooperate for example with control means, not shown, for changing or stabilizing the submersion depth. The fish is connected, for example, to a towing ship, at the surface, through conducting cables 4 ensuring the transmission of data obtained by echography, and traction cables 5.

The device at first comprises two lateral transducers 6 and 7 of elongate shape placed, for example, on the lateral walls of the fish and inclined to the same extent on both sides of a vertical line. By way of example, the axes of transducers 6 and 7 may advantageously be inclined by about 70° with respect to a vertical line. More generally, the lateral transducers 6 and 7 and their location in a transversal plane of the fish are so selected that their directivity diagrams each exhibit a secondary lobe whose axis is substantially oriented along a vertical line when the fish is stabilized and moves at a constant submersion depth. The main lobes of the directivity diagrams are oriented along the transducers axes and are used to produce echograms of the bottom surface on both sides of the path of the fish. Each transducer 6, 7 has at least two resonance frequencies, one of the compressional type and the other of the transversal type. By construction, these frequencies are chosen unequal, one of them $f_H$ being higher than the other $f_B$. The maximum resolution will be obtained with the higher frequency ($f_H$) and the longer range will be obtained with the lower frequency ($f_B$). By way of example, the frequencies $f_B$ and $f_H$ may be chosen respectively equal to 20 k $H_z$ and 70 k $H_z$.

The low frequency $f_B$ to which are tuned the two transducers 6, 7 being identical, they are respectively fed with pulse signals at frequencies $f'_B$ and $f''_B$, such as $$f'_B = f_B + \Delta f \quad (1)$$

$$f''_B = f_B - \Delta f \quad (2)$$

$\Delta f$ is a frequency band of a width lower than one half of the passing band $F_B$ which is the same for the transducers. The pulses of frequencies $f'_B$ and $f''_B$ respectively are extended by pulses at frequency $f_H$. When the power, transmitted along the secondary lobes oriented in the direction of the bottom is sufficient, a so-called parametric acoustic wave will be generated and propagated in a vertical direction, its frequency $f_P$ being twice the width of the passing band of the transducers. Frequency $f_P$ is very low, about 1 k $H_z$ and, accordingly, the parametric acoustic wave penetrates the sedimentary layers close to the bottom surface. The directivity of the parametric transmission is about the same as that of the secondary lobes of the directivity diagrams of the transducers. A sensor or hydrophone 8 is arranged at the base of the fish to receive the echoes of the parametric acoustic waves. Its passing band is tuned to frequency $f_P$.

The position of the fish with respect to the bottom is determined by the simultaneous detection of the echoes, received from transducers 6, 7, of the acoustic pulses transmitted in the direction of the secondary lobes, as described below.

The displacement velocity of the fish along a transversal direction is obtained by detection of the Doppler frequency shift to which are subjected the echoes of the acoustic pulses transmitted by transducers in the direction of their main lobes. The frequency shift due to the Doppler effect varies with the transmission and reception direction of the transmitted acoustic waves. In view of the large width of the beam transmitted from each transducer, the measurement of the transversal velocity is meaningless unless a reference axis OM is selected whose inclination is constant with respect to a vertical line and is included in the apex angle of the main lobe of transducers 6 and 7 (FIG. 3). The measurement of the velocity is then performed on the echoes received along said axis. $t_o$ being time interval for the propagation of the acoustic pulses transmitted along a vertical line in the secondary lobes of transducers over a distance OZ equal to the water depth h below the fish, the echoes received along direction OM of the main lobes arrive after a propagation time t such that:

$$t = \frac{t_o}{\cos\alpha} \quad (3)$$

$\alpha$ is preferably selected equal to 30°. In this case, the time interval t is equal to $$\frac{2 t_o}{\sqrt{3}}$$

The measurement of the transversal displacement velocity is then performed on the echoes received after a time interval t, of pulses transmitted along the main lobes of transducers 6, 7.

In order to determine also the displacement velocity of the fish along its longitudinal axis, the device further comprises two additional transducers 9 and 10 which are secured to the hull of the fish and are adapted to radiate acoustic energy at a frequency $f_H$ along two directions symmetrically inclined with respect to a vertical line (FIG. 1).

The Doppler frequency shift to which are subjected the acoustic waves received by transducers 9 and 10, are detected and the longitudinal velocity is deduced therefrom.

The control and actuation device shown in FIG. 4 comprises several transmission and reception channels associated to the transducers. The transducers 6, 7, 9 and 10 are respectively fed through transmission means comprising amplifiers 11, 12, 13 and 14 receiving from a transmission modulator 15, as described below, pulse signals at respective frequencies ($f'_B$, $f_H$) on the hand and ($f''_B$, $f_H$) on the other hand.

The lateral transducers 6 and 7 are also connected to reception means comprising respectively amplifiers 16 and 17, of fixed gain, and amplifiers of programmed gain (18, 19) for amplifying the received echoes. The amplified signals issued from amplifiers 18, 19 are respectively introduced into two demultiplexers 20 and 21, separating the high and low frequencies. Demultiplexer 20 delivers, on two different output channels, the signals received, for example, on the port side and whose frequencies correspond to the transmitted frequencies $f'_B$ and $f_H$. Demultiplexer 21 also delivers, on two different outputs, the signals received, for example, on the starboard side and whose frequencies correspond to the transmitted frequencies $f''_B$ and $f_H$. The output channels of demultiplexers 21 and 22 are connected to the channels of a multitraces recorder 22 of known type.

The outputs of amplifiers 16 and 17 are connected to a sensor 23 which detects the simultaneous arrival of the first echoes which are those of the acoustic pulses transmitted along the secondary lobes of lateral transducers 6 and 7. The simultaneous detection of echoes on two different reception channels permits to eliminate the influence of parasitic reflections. The detector 23 which has detected the first echo from the bottom surface generates a pulse ICI.

Transducers 9 and 10 are also connected to reception means 24 and 25 which amplify the echoes of the acoustic pulses at frequency $f_H$, transmitted towards the bow and towards the stern of the ship. The reception means 24 and 25 are respectively connected to elements 26 and 27 measuring the period of the signals received by transducers 9 and 10. The outputs of demultiplexers 20 and 21 producing high frequency signals are also respectively connected to elements 28 and 29 measuring the period of the signals received by lateral transducers 6 and 7.

The outputs of the measuring elements 26, 27, 28 and 29 are connected to a computer 30. The latter compares the periods of the signals received on the two channels 9 and 10, modified by the Doppler effect, with the period of the corresponding transmitted signals and deduces therefrom the displacement velocity $V_x$ of the fish with respect to the bottom surface along its main direction of displacement.

The pulse ICI, generated by sensor 23 at the time of arrival of the first echoes from the bottom, is transmitted to computer 30 which also calculates the propagation time of the acoustic signals and, accordingly, the water depth below the fish as well as the value of the time intervals t (see relation 3). At the end of this time interval, it compares the periods of the signals measured by the measuring elements 28 and 29 with that of the transmitted signals and deduces therefrom the transversal velocity $V_y$ of the fish with respect to the bottom surface.

The computer is of the digital type and performs its calculation by making use of an internal clock producing pulses H of very high frequency defining a time scale. The pulses H are used as time basis by the measuring elements 26, 27, 28 and 29 to determine the period of the received signals.

Hydrophone 8 is connected to reception means comprising a fixed gain amplifier 31 and a programmed gain amplifier 32 whose output is connected to an input channel of recorder 22. The gain program law of amplifiers 18, 19 and 32 as well as the control pulses of modulator 15 are prerecorded in computer 30 and delivered at each emission-reception cycle by the latter.

The transmission modulator 15 shown in FIG. 5 comprises two identical sub-assemblies, each comprising a memory (33, 34) adapted to sequentially supply to a digital to analog decoder (43, 44) a series of memorized values when actuated by an external signal. The number n of memorized values corresponds to n successive samples of the sine function distributed over the time period of a $2\pi$ radians cycle. At addresses 0 and n−1 of each memory is registered the zero value. From n digital values contained in each memory, the digital to analog decoder (43, 44) reconstitutes a sinusoidal function whose frequency depends on the period of the external control signal which sequentially reads each memory. By way of example, n may be chosen equal to 512, i.e. $2^9$.

The external control or addressing signal is supplied to memories 33 and 34 respectively through two counters 35 and 36 of n standard i.e. adapted to come back to the zero value when they have counted n pulses. Counters 35 and 36 receive, on their counting inputs, pulses delivered respectively by counters 37 and 38, respectively of N and N' modules i.e. adapted to come back to a zero value when they have counted respectively N and N' pulses, which are delivered thereto by a clock 45. The latter produces frequency pulses $H_1$ and $H_2$ which are supplied to the counting inputs of counters 37 and 38 through switches IV and electronic circuit breakers IT, diagrammatically shown on the figure.

The device also comprises a period counter 39, counting the number of successive zero resettings of counter 35. A decoder 40 is adapted to produce a pulse when the number contained in the period 39 reaches the value $N_1$ and when this number reaches the value $N_1+N_3$. A first bistable flip-flop 41 may be actuated by an external initialization signal $T_B$ and by pulse corresponding to $N_1$, produced by decoder 40. The signal $T_B$ is also used to reset to zero counters 35, 36, 37, 38 and 39. An output of the first bistable flip-flop 41 delivers a signal which controls the switches IV and is connected to a selection input of counter 37. This control is used to change from N to N', the maximu value which produces its reset to zero.

Finally, a second bistable flip-flop 42, actuated either by the initialization signal $T_B$, or by the pulse corresponding to $N_1+N_3$, generated by decoder 40, produces, on an output, a control signal for the circuit breakers IT.

The transmission modulator is operated as follows:

The instant at which the acoustic pulses begin to be transmitted is defined by pulses $T_B$ transmitted by recorder 22 (FIG. 4) which initiates counters 35, 36, 37, 38 and 39 and actuates flip-flops 41 and 42 with the effect of closing the circuit breakers IT and switching the switches IV onto the outputs of clock 45 producing pulses at frequency $H_1$. Accordingly, the counters 35 and 36 receive pulses at respective frequencies $H_1/N$ and $H_1/N'$ and deliver, at the same frequencies, pulses which actuate the two sub-assemblies (33, 43) and (34, 44).

The zero resets of counters 35 and 36 are produced with respective frequencies $(H_1/nN)$ and $(H_1/nN')$ corresponding respectively to frequencies $F'_B$ and $F''_B$ (relationships 1 and 2). After $N_1$ half-periods, counted by decoder 40, the inputs of counters 37 and 38 are connected to the outputs of clock 45 producing clock pulses at frequency $H_2$ through switches IV. The frequency $F''_B$ is so selected that, during the time interval equivalent to $N_1$ half-sinusoids at frequency $F'_B$, $N_2$ half-sinusoids at frequency $F''_B$ are delivered by decoder 44 i.e. in accordance with the relationship:

$$\frac{N_1}{F_1} = \frac{N_2}{F_2} \quad (4)$$

which is equivalent to:

$$N_2 = N_1 \times \frac{N}{N'} \quad (5)$$

The pulse corresponding to $N_1$, supplied by decoder 40, has also the effect, through the bistable flip-flop 41, of changing from N to N' the number of pulses for which counter 37 is reset to zero.

The two counters 37 and 38 will then supply to counters 35 and 36 pulses at an identical frequency ($H_2/N'$). The frequency of the resets to zero of counters 35 and 36 is $f_H$ (FIG. 2). The preceding process of formation of sinusoids is the same for the two subassemblies (33, 43) and (34, 44) until the decoder 40 has recorded $N_1+N_3$ half periods and has generated a pulse which opens the circuit breakers IT and stops any counting operation up to the arrival of the following initialization pulse TB.

It results from each operating sequence of the transmission modulator that the digital to analog decoders 43 and 44 produce, at each transmission-reception cycle, respectively on the one hand one pulse of width Θ consisting of a signal of frequency $f'_B$ followed with a signal of frequency $f_H$ and, on the other hand, a pulse, also of width Θ (see relationships 3 and 4) consisting of a signal of frequency $f''_B$ followed with a signal of frequency $f_H$.

The signals, amplified by amplifiers 16 and 18 on the one hand and 17 and 19 on the other hand, and respectively filtered through two demultiplexers 20 and 21 (FIG. 6 resuming FIG. 4), which divide them into signals of low frequency ($f'_B$ or $f''_B$) and of high frequency ($f_H$), are introduced in a computing member 45, FIG. 6. The latter is, for example, an element adapted to calculate the quotient between the two input signals. $(A'_B)_T$ and $(A_H)_T$ being the respective amplitudes of signals at low frequency $f'_B$ and high frequency $f_H$, received for example on the starboard side, the computation member is adapted to calculate the ratio:

$$K_T = \left(\frac{A'_B}{A_H}\right)_T \quad (6)$$

or the inverse ratio. It also calculates the ratio $$K_B = \left(\frac{A''_B}{A_H}\right)_D \quad (7)$$

of the corresponding amplitudes of the frequency signals $f''_B$ and $f_H$ received on the port side.

If the gain program of the programmed gain amplifiers 18 and 19 has been selected to compensate for the weakening of the low frequency signals in relation with the propagation time, the computation member 45 takes into account the greater weakening of the high frequency signals, by computing the ratios:

$$K_{T'} = \left(\frac{A'_B}{gA_H}\right)_T \quad \text{and} \quad (8)$$

$$K_{B'} = \left(\frac{A''_B}{gA_H}\right)_T \quad (9)$$

wherein g is a multiplying factor greater than one.

On the contrary, when the gain program of amplifiers 18, 19 has been selected to compensate for the weakening of the high frequency signals in relation with the distance, the computation member 45 determines the preceding amplitude ratios with a factor g lower than 1.

The exploitation of the results supplied by the computer 45 may be achieved by determining a series of values for coefficients $K_T$ and $K_B$ on sandy bottoms in relation with time as variable and optionally by plotting a representative curve.

The recognition of bottoms covered with pebbles is thus achieved by detecting the abrupt variations of the values of coefficients $K_T$ and $K_B$ with respect to the assembly of the reference values.

This operation is conducted for example by means of a comparator 46, connected to the computer 45, which compares the successive values of coefficients $K_T$ and $K_B$ with all the reference values.

It would not be outside the scope of the invention to use the computer 30 (FIG. 4), to which is assigned the determination of the displacement velocities $V_x$ and $V_y$ of the fish, for also performing the tasks of the computer 45 and of the comparator 46.

It will also be possible, more generally, to replace the arithmetic ratio of the amplitude values respectively of the low frequency and the high frequency signals by any combination of these values or by any other parameter which is characteristic of the received signals, showing discontinuities in accordance with the nature of the bottom on survey.

In the described embodiment, the device is incorporated into a submerged fish towed behind the ship. It would not be outside the scope of the invention to directly incorporate the device into a surface ship or a submarine.

What I claim is:

1. A device of the sonar type, placed in a vehicle movable with respect to a submerged surface, comprising acoustic means for determining the displacement velocity of the ship along a first displacement direction, at least one transducer whose directivity diagram comprises a main transmission lobe, the axis of which is inclined with respect to a vertical line in a plane orthogonal to the first direction as well as a secondary transmission lobe substantially oriented along a vertical line, each said transducer being adapted to transmit and receive acoustic waves at two different frequencies, transmission means for controlling the transmission each transducer of acoustic pulses at two different frequencies, and reception means to generate, from echoes of the pulses transmitted by the transducer, echograms of the submerged surface, laterally with respect to the first direction of displacement of the vehicle, to determine the water depth below the vehicle, by measuring the propagation time of the waves transmitted along the directions of the secondary transmission lobe, and to calculate its displacement velocity along a direction orthogonal to the first direction, by measuring the frequency of the acoustic waves received along a particular direction of the main transmission lobe of the transducer.

2. A device according to claim 1, wherein said vehicle is towed, when immersed, by a ship.

3. A device according to claim 1, wherein said vehicle is a submarine.

4. A device according to claim 1, wherein the reception means comprises means for comparing identical characteristics of the received echoes corresponding respectively to the transmitted acoustic pulses of different frequencies.

5. A device according to claim 4, wherein the comparing means comprises an assembly for determining the quotient between the values of the identical characteristics of the received echoes.

6. A device according to claim 5, wherein the assembly for determining the quotient is connected to demultiplexing means for separating the signals of different frequencies received respectively by each transducer, the identical characteristics being the amplitudes of said echoes.

7. A device according to claim 1, wherein the reception means comprises demultiplexing means for separating the signals of different frequencies received by each said transducer, means for recording said received signals, means for detecting the arrival of the first echoes from the submerged surface, means for measuring the period of the signals received in the main lobes of the directivity diagram of each transducer after a propagation time interval proportional to that of the first echoes and a computer for determining the displacement velocity along said orthogonal direction.

8. A device according to claim 7, wherein the acoustic means comprises at least one acoustic pulse transmitter receiver member whose main transmission axis is in a plane containing the first displacement direction and is inclined with respect to a vertical line, characterized in that the transmission means are fed with pulses whose frequency is the highest frequency produced by the transmission means and in that the reception means comprises elements for measuring the period of the signals received by each transmitter-receiver member, said element being connected to the computer.

9. A device of the sonar type, placed on the vehicle displacable with respect to a submerged surface, comprising acoustic means for determining the displacement velocity of the vehicle along a first displacement direction, two transducers whose directivity diagram comprises a main transmission lobe whose axis is inclined with respect to a vertical line in a plane orthogonal to the first direction as well as a secondary transmission lobe substantially oriented along a vertical line, each said transducer being adapted to transmit and receive acoustic waves at two different frequencies, transmission means for controlling the transmission by each of the two transducers of acoustic pulses at a first frequency identical for each of the two transducers and at a second frequency different for the two transducers, the gap between the respective second frequencies of the two transducers being substantially equal to twice the passing band of the transducers, a sensor whose axis is oriented substantially along a vertical line and adapted to receive the echoes of parametric waves resulting from the combination of pulses of different frequencies and reception means for generating, from echoes of the pulses transmitted by the transducers, echograms of the submerged surface, laterally with respect to the first direction of displacement of the vehicle, to determine the water depth below the vehicle, by measuring the propagation time of the waves transmitted along the directions of the secondary transmission lobes and for calculating its displacement velocity along a direction orthogonal to the first direction, by measuring the frequency of the acoustic waves received along a particular direction of the main transmission lobes of the two transducers.

10. A device according to claim 9, wherein the transmission means comprises a modulator consisting of decoding means for reconstituting analog signals from digital values stored in memorization means and digital control means for controlling the sequential picking up of the digital values from the memorization means.

11. A device according to claim 9, wherein the transmission means comprises a modulator consisting of two decoding members for reconstituting analog signals from values memorized in two memorization members and digital control means for controlling the sequential pickup of digital values respectively from the two memorization members.

12. A device according to claim 11, wherein the digital control means is connected to a clock member adapted to produce, on two different outputs, pulses defining two different time scales and comprises switching means, circuit breakers, a first system of counters for dividing the frequency of the clock pulses by a predetermined number and a second system of counters for dividing the frequency of the clock pulses successively by a first and a second predetermined numbers, the pulses issued from both counter systems being adapted to respectively control the two memorization members.

13. A device according to claim 12, which further comprises means, controlled by the pulses issued from one of the two counter systems, for actuating the switching members to switch the inputs of the two counter systems successively on the two outputs of the clock member and for actuating the circuit-breakers.

14. A device according to claim 9, wherein the reception means comprises demultiplexing means for separating the signals of different frequencies received by the two transducers, means for recording said received signals, means for detecting the arrival of the first echoes from the submerged surface, means for measuring the period of the signals received in the main lobes of the directivity diagrams of the transducers after a propagation time interval proportional to that of the first echoes and a computer for determining the displacement velocity along said orthogonal direction.

15. A device according to claim 14, wherein the acoustic means comprises two acoustic pulse transmitter-receiver members whose main transmission axes are in a plane containing the first displacement direction and are inclined with respect to a vertical line, characterized in that the transmission means are fed with pulses whose frequency is the highest frequency produced by the transmission means and in that the reception means comprises elements for measuring the period of the signals received by the transmitter-receiver members, said elements being connected to the computer.

16. A device according to claim 9, wherein said vehicle is towed, when immersed, by a ship.

17. A device according to claim 9, wherein said vehicle is a submarine.

18. A device according to claim 9, wherein the reception means comprises means for comparing identical characteristics of the received echoes corresponding respectively to the transmitted acoustic pulses of different frequencies.

19. A device according to claim 18, wherein the comparing means comprises an assembly for determining the quotient between the values of the identical characteristics of the received echoes.

20. A device according to claim 19, wherein the assembly for determining the quotient is connected to demultiplexing means for separating the signals of different frequencies received respectively by each of the two transducers, the identical characteristics being the amplitudes of said echoes.

* * * * *